J. KING.
GAME APPARATUS.
APPLICATION FILED MAR. 22, 1915.
1,215,033.
Patented Feb. 6, 1917.
4 SHEETS—SHEET 1.
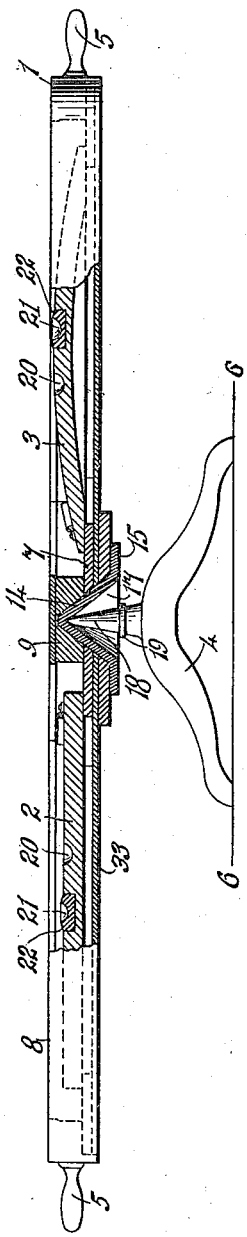
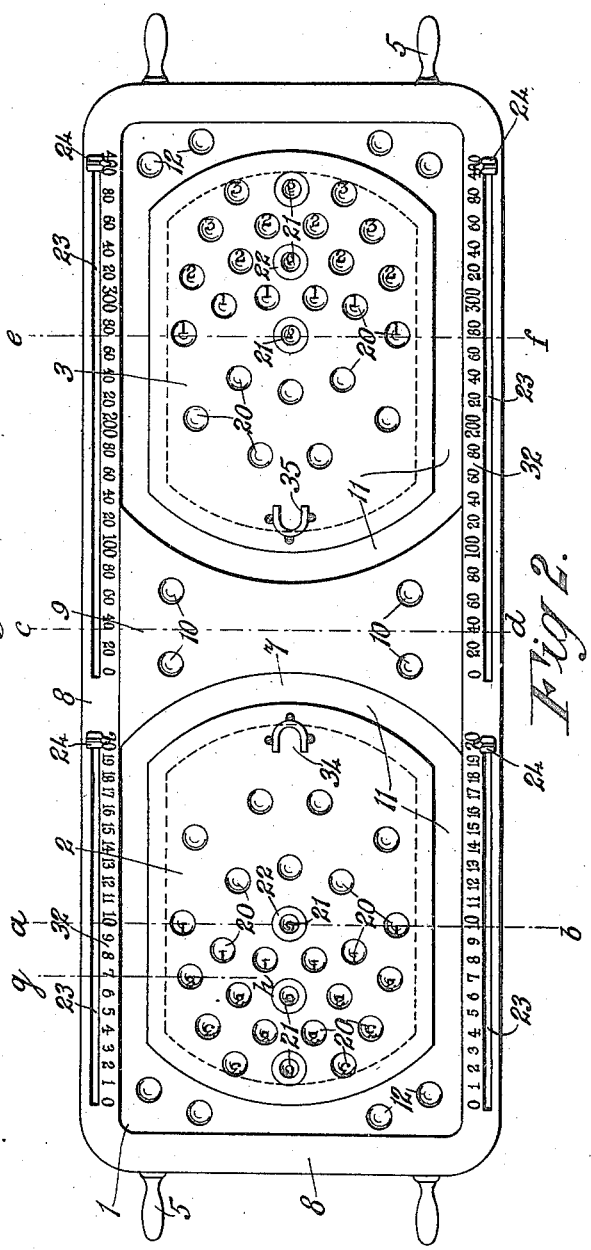

J. KING.
GAME APPARATUS.
APPLICATION FILED MAR. 22, 1915.
1,215,033.
Patented Feb. 6, 1917.
4 SHEETS—SHEET 2.
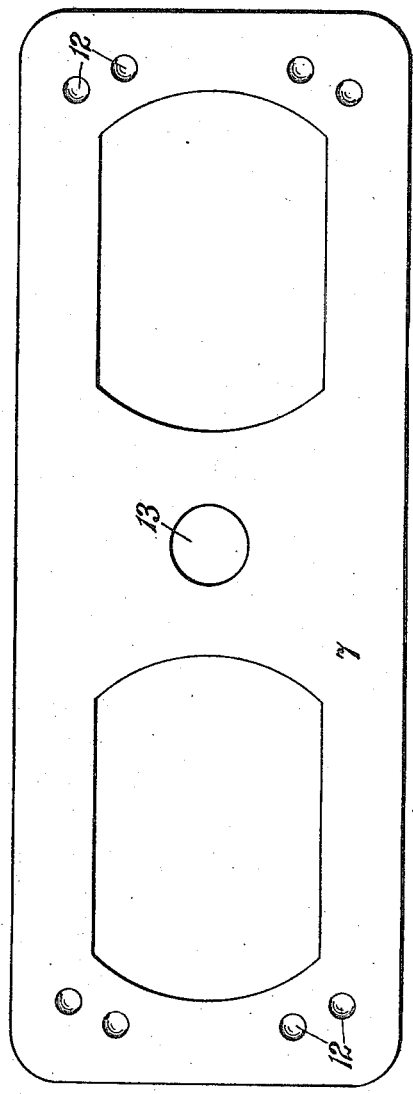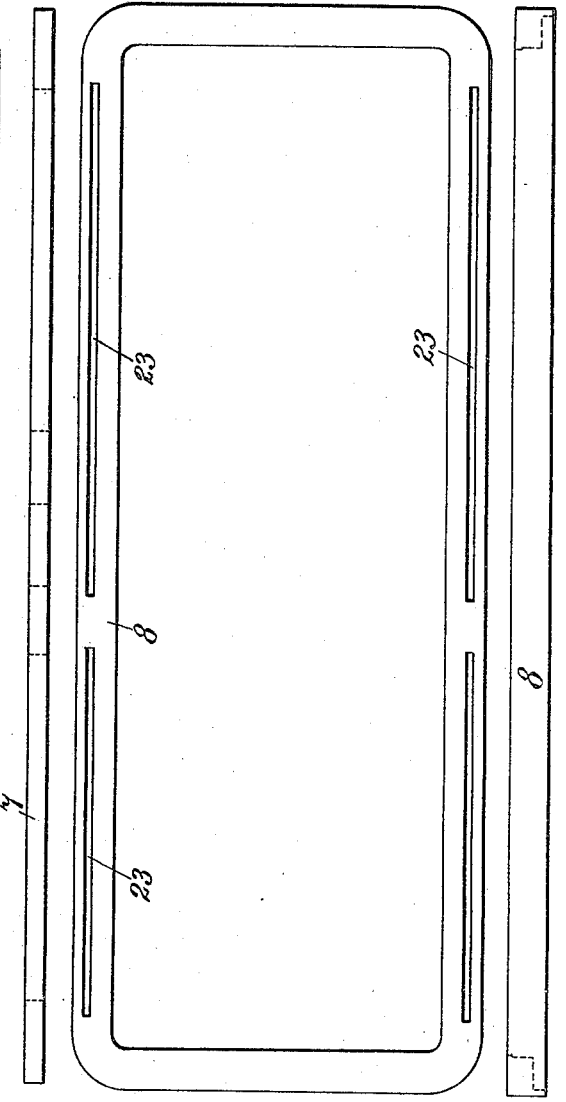
Fig. 3.   Fig. 4.   Fig. 5.   Fig. 6.
Witnesses:—
Edna F. Young
Iva P. Hines
Inventor:—
James King J. KING.
GAME APPARATUS.
APPLICATION FILED MAR. 22, 1915.
1,215,033.  Patented Feb. 6, 1917.
4 SHEETS—SHEET 3.
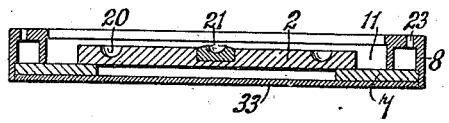
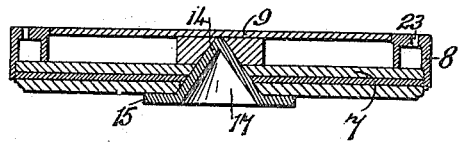
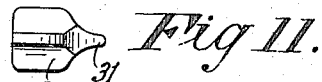
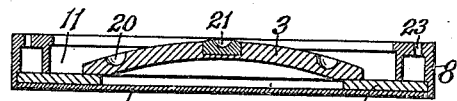
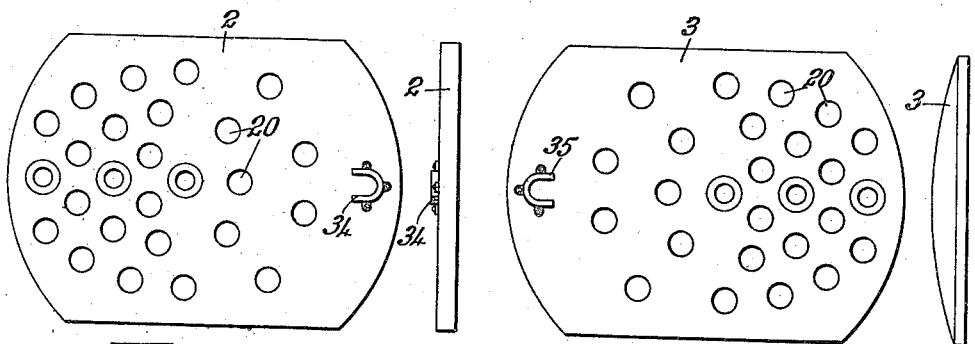
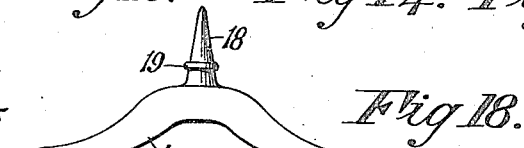
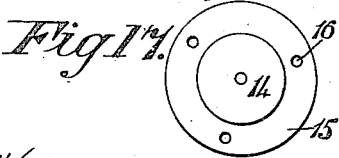
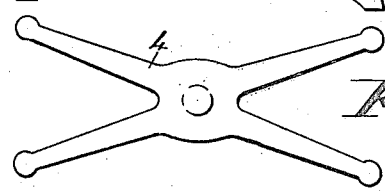
Witnesses:—
Edna E. Young
Ira P. Hines
Inventor:—
James King J. KING.
GAME APPARATUS.
APPLICATION FILED MAR. 22, 1915.
1,215,033.
Patented Feb. 6, 1917.
4 SHEETS—SHEET 4.
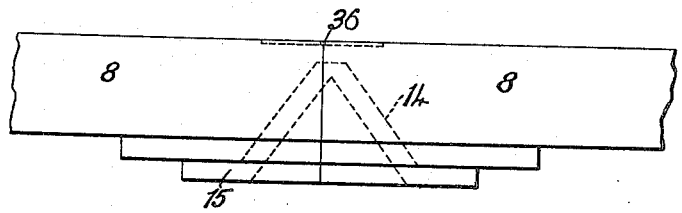
Fig 20.ª
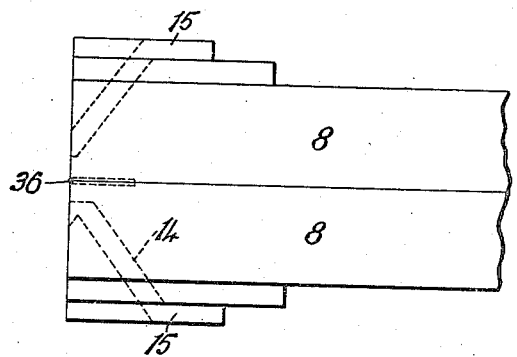
Fig 21.
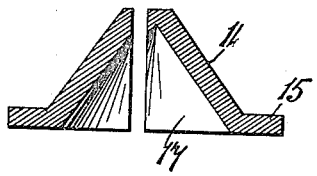
Fig 22.
Inventor:-
James King
by Connolly Bros
atty

UNITED STATES PATENT OFFICE.

JAMES KING, OF LEICESTER, ENGLAND.

GAME APPARATUS.

1,215,033.  Specification of Letters Patent.  Patented Feb. 6, 1917.

Application filed March 22, 1915. Serial No. 16,087.

*To all whom it may concern:*

Be it known that I, JAMES KING, a subject of the King of Great Britain, residing at Leicester, in the county of Leicester, England, have invented a certain new and useful Improved Game Apparatus, of which the following is a specification, reference being had therein to the accompanying drawing.

This invention relates to an improved apparatus for playing games of skill with board and balls and concerns games of the kind wherein a table or board having holes, recesses, pockets or the like therein is tilted and manipulated by the player with the object of causing balls to enter certain of the holes or the like to score an agreed number of points.

The invention is an improvement in game apparatus of this character wherein the table is movably mounted upon a central or approximately central point of support about which it may be tilted universally by the player, an example of such an apparatus being described in the specification of British Patent No. 97 of 1893.

The present invention comprises important improvements the chief of which are that the table is so mounted as to automatically balance or assume a normal horizontal position when not in use; part of the playing surface of the table is made convex and some of the scoring holes or the like have inclined runs or margins to necessitate the exercise of more skill in playing the game; and a scoring device is combined with the table to render the apparatus quite self contained.

The improved apparatus will be fully described with reference to the accompanying drawings, wherein:—

Figure 1 is a partly sectional elevation of the apparatus.

Fig. 2 is a plan of the same.

Figs. 3 and 4 are respectively plan and side view of the supporting frame or base of the table.

Figs. 5 and 6 are respectively plan and side view of the scoring frame of the table.

Fig. 7 is a transverse section of the table taken on the line *a—b* of Fig. 2.

Fig. 8 is a similar view on the line *c—d* of Fig. 2.

Fig. 9 is a further similar view on the line *e—f* of Fig. 2.

Fig. 10 is a section on the line *g—h* of Fig. 2.

Fig. 11 is a plan of the scoring indicator.

Fig. 12 is a plan and Fig. 13 an end elevation of the flat board of the playing table.

Fig. 14 is a plan and Fig. 15 is an end elevation of the convex board of the playing table.

Fig. 16 is a partly sectional elevation and Fig. 17 is a plan of the cone center piece of the table.

Figs. 18 and 19 are respectively plan and elevation of the table stand.

Fig. 20 is a vertical section of one of the holes or recesses having an inclined margin.

Figs. 20ª, and 21, show in side elevation, a modification wherein the table is constructed to fold.

Fig. 22, shows, in section the divided cap of such table.

Figs. 10, 11 and 20 to 22 are drawn to a larger scale than the remaining figures, and like parts are designated by the same reference characters throughout the drawings.

The improved apparatus to designate which the trade name of "Tilta" is employed, comprises generally (Figs. 1 and 2) a table device 1 provided on its upper side with two playing boards 2 and 3 each furnished with holes or recesses having a suitable disposition therein, the device being centrally pivotally mounted upon a stand 4 and provided at each end with handles 5 by which it may be manipulated upon its supporting stand 4. The latter is adapted to rest upon an ordinary table or other support the surface of which is represented by the line 6—6 in Fig. 1.

The table device is composed of a base 7 (Figs. 3 and 4) to which is secured by suitable means a marginal frame structure 8 (Figs. 5 and 6) furnished along its sides with movable scoring indicators as will be described later. Also secured to the base 7 and situated within the open interior of the frame 8 are the playing boards 2 and 3 (Figs. 12 to 15), the board 2 having a flat upper surface and the board 3 a convex upper surface.

Situated transversely across the center of the device and secured to the base 7 is a block, filling-piece or platform 9 (Figs. 1 and 2) having in its upper face holes 10 which serve as receptacles for the balls when the latter are not in use.

Surrounding each board is a gutter 11 (Figs. 1, 2, 7, 9 and 10) the sides of which are constituted on the one hand by the inside of the marginal frame 8 and edge of the filling-piece 9, and on the other hand by the edges of the playing board. These gutters catch the balls when they roll off the playing boards, holes, recesses or pockets 12 (Figs. 2 and 3) being furnished in the base 7 into which the balls may drop and finally come to rest.

The base 7 has a central opening 13 through which a metal conical cap 14 (Figs. 1, 8, 16 and 17) extends from the underside. This cap has an annular flange 15 through holes 16 in which screws may be passed to secure it to the underside of the base 7. The cap 14 by reason of its hollow conical interior 17 is adapted to rest upon a pointed upstanding center-piece 18 of the stand 4 (Figs. 1, 18 and 19) the angularity of the conical interior 17 being greater than that of the center-piece so that the cap 14 is free to tilt universally upon the point of the center-piece. Instead of the center-piece and cone a universal joint may be used to support the table.

An important feature of the improved construction is that the cap 14 extends upward through or into the table a sufficient distance for the apex of the conical interior 17 which is coincident with the point of support of the device to be situated above the center of gravity of the table so that the said device will—when released—automatically balance or spontaneously assume a normal horizontal position.

To obviate jar or concussion when the table is tilted to such a degree that the interior of the cap 14 is caused to make contact with the side of the center-piece 18, the latter has therearound a rubber ring 19 secured in position by cement or located in a recess and adapted to act as a cushion. The feet of the stand 4 are preferably provided on the underside with suitable buffers or pads (not shown) to prevent the stand slipping upon and scratching or marking any polished surface upon which it may be positioned.

The handles 5, by which the player manipulates the table by tilting it in any desired direction upon the supporting pivot point 18, are secured to the ends of the marginal frame 8.

The previously mentioned holes or recesses in the playing boards 2 and 3 preferably comprise trip holes such as 20 and high-scoring holes such as 21. All the holes may be scoring holes i. e. they may count so many points but the trip holes are preferably arranged to represent scoring points of less values than the holes 21. The latter which count the higher scoring values have, as shown in Fig. 20, surrounding marginal surfaces 22 which are slightly inclined from the surface of the board to the edge of the hole or recess thus rendering it more difficult to get the balls to enter such holes or recesses than is the case with the trip holes 20 which have no inclined surrounding margin. The invention is not to be confined to the use of any particular number and disposition of high-scoring holes, neither is it to be restricted to any specific combination of high-scoring holes and trip holes. The trip holes or some of them may be blanks i. e. non-scoring holes.

The marginal frame 8 is furnished along its sides with slots 23 (Figs. 2 and 10) along each of which is movable a scoring indicator 24 see Figs. 10 and 11. This device is provided on its underside with a depending flange 25 adapted to bear against one side of the slot 23 and provided at its lower extremity with a foot 26. A compression spring 27 operates between the flange 25 and a plate 28 which bears against and is adapted to slide along the opposite side of the slot 23, the lower extremity of said plate being bent or inclined as indicated at 29. The slot opens at the bottom into a cavity or chamber 30 into which the foot 26 of the flange 25 and bent end 29 of the plate 28 extend laterally and serve to prevent upward displacement of the indicator 24. The indicator may be moved along the slot 23 by hand to bring its pointer 31 into coincidence with any of the numbers marked upon the face 32 of the frame 8 and which represent amounts of score, the spring 27 acting to press the sliding parts 25 and 28 against the sides of the slot 23 to frictionally hold the indicator in whatever position it may be moved to and prevent movement of the same on its own accord when the table is being manipulated by the player. The spring 27 also allows the plate 28 to be pressed toward the flange 25 for the purpose of inserting the indicator into the slot 23. It may be remarked here that any score numbers desired may be marked upon the face 32.

The table may be furnished on its underside with a back board 33 (Fig. 10), and in addition to the previously mentioned holes or recesses, the playing boards 2, 3 have start shoes 34, 35 respectively, see Figs. 12 to 15, consisting of upstanding U shaped rims adapted to retain a ball prior to the commencement of play.

In using the hereindescribed improved apparatus the stand 4 is placed upon a table or other convenient support and the table device 1 is mounted upon the pivot point 18 of the stand, the apparatus being arranged at a convenient height to enable the player to grasp the handles 5, and see the playing boards 2, 3. Rules for the game are set forth in the aforesaid British specification, but briefly the general method of operation consists in using five red balls in conjunction with the apparatus four of which while not immediately required are placed in the holes 10, the other being placed in the start shoe 34 or 35 on the playing board 2 or 3, the table device being in the normal horizontal position. The player then takes hold of the handles 5 at that end of the table remote from the playing board which is to be used and by tilting said table upon its pivotal support 18 causes the ball to run out of the start shoe over the playing board toward the holes or recesses 20, 21, his object then being by skilful manipulation of the table on the pivot, to cause the free ball to run over the playing board and enter any scoring hole he may select. It is intended that the player should first use the flat playing board 2 and then the convex board 3 the latter requiring greater skill than the former.

The invention is not to be limited to the number or color of the balls employed, neither is it essential that the table device should have a flat and convex playing board as both boards may be flat or they may be convex.

If desirable the table device may be made shorter and have only one playing board such table being pivotally mounted to balance in the hereindescribed manner.

The double boarded table may as shown in Fig. 20ª be hinged or jointed transversely at or about the center line so as to be capable of folding on the pivot 36, the two halves coming together face to face as shown in Fig. 21 to protect the surfaces of the playing boards and also render the device more conveniently portable. In this modification the cone cap 14 will as shown in Fig. 22 be made in halves, the parts thereof being secured to the respective halves of the table (Fig. 21) so that when the latter is opened or extended for use the two half cap portions will come together to form the hollow conical cavity (Fig. 20ª) to rest upon the stand 4.

The invention is not to be restricted to the specific details of construction herein set forth as these admit of modification without departing from the scope of the invention as defined by the appended claims.

What I claim then is:—

1. A game apparatus comprising, in combination, a table device, a flat playing board thereon, a convex playing board thereon, said boards having holes or recesses therein, means to support the table in such a manner as to permit a universal tilting movement thereof, and handles on the table by which the player may tilt and manipulate the latter to control the direction of movement of a ball on either of the playing boards, for the purpose described.

2. A game apparatus comprising, in combination, a table device, a playing board or boards thereon having holes or recesses therein, an upwardly inclined margin round some of the said holes or recesses, and means to support the table in such a manner as to permit a universal tilting movement thereof, for the purpose described.

3. A game apparatus comprising, in combination, a table device, a playing board or boards thereon having a convex surface and holes or recesses therein, an upwardly inclined margin round some of the said holes or recesses, and means to support the table in such a manner as to permit a universal tilting movement thereof, for the purpose described.

4. A game apparatus comprising, in combination, a table device adapted for scoring points by the use of a ball thereon, a supporting stand and a pivot point thereon, a hollow conical cap on the table adapted to rest upon the pivot point and arranged so that the point of support is situated above the center of gravity of the table whereby the latter automatically balances, said table being formed in halves hingedly connected whereby it may be folded, and the aforesaid cap being also formed in halves which parts are attached to the respective halves of the table and arranged to meet to form the complete supporting cap when the table portions are extended, for the purpose described.

In testimony whereof I affix my signature in presence of two witnesses.

JAMES KING.

Witnesses:
B. W. C. TAYLOR,
GEORGE LESTER.

Copies of this patent may be obtained for five cents each, by addressing the "Commissioner of Patents, Washington, D. C."